United States Patent
Kim et al.

(10) Patent No.: US 9,356,314 B2
(45) Date of Patent: May 31, 2016

(54) METALLIZATION PATTERN ON SOLID ELECTROLYTE OR POROUS SUPPORT OF SODIUM BATTERY PROCESS

(71) Applicants: Jin Yong Kim, Richland, WA (US); Guosheng Li, Richland, WA (US); Xiaochuan Lu, Richland, WA (US); Vincent L. Sprenkle, Richland, WA (US); John P. Lemmon, Kennewick, WA (US)

(72) Inventors: Jin Yong Kim, Richland, WA (US); Guosheng Li, Richland, WA (US); Xiaochuan Lu, Richland, WA (US); Vincent L. Sprenkle, Richland, WA (US); John P. Lemmon, Kennewick, WA (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 283 days.

(21) Appl. No.: 13/776,262

(22) Filed: Feb. 25, 2013

(65) Prior Publication Data

US 2014/0242471 A1  Aug. 28, 2014

(51) Int. Cl.
| | |
|---|---|
| *H01M 6/18* | (2006.01) |
| *H01M 10/0562* | (2010.01) |
| *H01M 10/39* | (2006.01) |
| *H01M 6/20* | (2006.01) |

(52) U.S. Cl.
CPC .......... *H01M 10/0562* (2013.01); *H01M 6/187* (2013.01); *H01M 6/20* (2013.01); *H01M 10/3927* (2013.01); *H01M 10/3936* (2013.01); *H01M 2300/0094* (2013.01)

(58) Field of Classification Search
CPC ....... H01M 6/18; H01M 6/187; H01M 6/185; H01M 10/0562; H01M 2/1673
USPC .......................................................... 429/104
See application file for complete search history.

(56) References Cited

U.S. PATENT DOCUMENTS

| | | | |
|---|---|---|---|
| 3,502,554 A | 3/1970 | Fehlner | |
| 4,135,040 A | 1/1979 | Thornton | |
| 4,197,363 A | 4/1980 | Topouzian et al. | |
| 4,226,922 A * | 10/1980 | Sammells | 429/104 |
| 4,797,332 A | 1/1989 | Barrow et al. | |
| H858 H * | 12/1990 | Leonard et al. | 429/104 |
| 5,098,799 A | 3/1992 | Bowen et al. | |
| 5,350,645 A | 9/1994 | Lake et al. | |
| 5,766,789 A | 6/1998 | James et al. | |
| 6,007,943 A | 12/1999 | Coetzer | |
| 6,432,584 B1 | 8/2002 | Visco et al. | |
| 6,638,412 B2 | 10/2003 | De Nora et al. | |
| 7,862,920 B1 | 1/2011 | Teeters et al. | |

(Continued)

FOREIGN PATENT DOCUMENTS

| | | |
|---|---|---|
| DE | 2431152 A1 | 1/1976 |
| JP | S6380483 A | 4/1988 |

OTHER PUBLICATIONS

International Search Report/Written Opinion of International Application No. PCT/US2013/070818, International Filing Date Nov. 19, 2013, Date of Mailing Feb. 17, 2014.

*Primary Examiner* — Stewart Fraser
*Assistant Examiner* — Olatunji Godo
(74) *Attorney, Agent, or Firm* — James D. Matheson

(57) ABSTRACT

A new battery configuration and process are detailed. The battery cell includes a solid electrolyte configured with an engineered metallization layer that distributes sodium across the surface of the electrolyte extending the active area of the cathode in contact with the anode during operation. The metallization layer enhances performance, efficiency, and capacity of sodium batteries at intermediate temperatures at or below about 200° C.

14 Claims, 7 Drawing Sheets

(56) References Cited

U.S. PATENT DOCUMENTS

| | | | |
|---|---|---|---|
| 7,931,981 B2 | 4/2011 | Boone et al. | |
| 8,187,740 B2 | 5/2012 | Nathan et al. | |
| 2002/0172871 A1* | 11/2002 | Schucker | 429/304 |
| 2005/0269202 A1 | 12/2005 | De Nora et al. | |
| 2007/0154762 A1* | 7/2007 | Schucker | B32B 18/00 429/129 |
| 2010/0261071 A1* | 10/2010 | Lopatin et al. | 429/345 |
| 2010/0279175 A1* | 11/2010 | Young | H01M 4/13 429/303 |
| 2011/0076542 A1 | 3/2011 | Farmer | |
| 2011/0143202 A1 | 6/2011 | Farmer et al. | |
| 2011/0244303 A1 | 10/2011 | Rahmane et al. | |

* cited by examiner

Porous
(Non-Homogeneous)

Porous
(Homogeneous)

METALLIZATION PATTERN ON SOLID ELECTROLYTE OR POROUS SUPPORT OF SODIUM BATTERY PROCESS

STATEMENT REGARDING RIGHTS TO INVENTION MADE UNDER FEDERALLY-SPONSORED RESEARCH AND DEVELOPMENT

This invention was made with Government support under Contract DE-AC05-76RLO1830 awarded by the U.S. Department of Energy. The Government has certain rights in the invention.

FIELD OF THE INVENTION

The present invention relates generally to sodium batteries. More particularly, the invention relates to a metallization pattern for solid electrolytes and porous supports of sodium-forming batteries and process.

BACKGROUND OF THE INVENTION

Operation of sodium batteries [e.g., ZEBRA batteries and sodium-sulfur (Na/S) batteries] at intermediate temperatures 200° C.) has several advantages, including lower degradation in cell performance and ability to use low cost materials for construction and sealing. However, it is a well-known problem in the technical art that molten sodium does not adhere (i.e., wet) well at intermediate temperatures to the solid electrolyte in sodium batteries. Poor wettability can lead to pooling of molten sodium in a localized area (i.e., "localization") at the base, e.g., on the anode side of the solid electrolyte. Localization of sodium metal reduces the active area of the cathode. "Active area" (or "effective operation area") as defined herein is the fraction (or portion) of the cathode actively engaged in transfer of ion charge through the solid electrolyte to the anode or vice versa. The active area of the cathode varies depending on the area amount of the solid electrolyte in direct physical contact and in operation with sodium formation in concert with the anode. Reduction in active area decreases the capacity to transfer ion current through the solid electrolyte during operation, which decreases the effective efficiency and energy capacity of the battery (cell) upon demand. Decrease in cell performance can be particularly pronounced at intermediate temperatures 200° C.) when wetting of the electrolyte surface by sodium is reduced.

Accordingly, new devices and processes are needed that expand the active area of the cathode during operation that increases the energy cycling and charge transfer capacity of sodium batteries. The present invention addresses these needs.

SUMMARY OF THE INVENTION

The present invention includes a solid electrolyte. The solid electrolyte may include: an engineered metallization layer on the surface of the solid electrolyte. The metallization layer may include an electrically conducting pattern with features that are engineered to be filled with sodium metal from a sodium metal-forming anode that form distinct metal islands across the surface of the solid electrolyte during operation. The metallization layer may increase the active area of a cathode in electrical communication with the anode via the solid electrolyte compared with a battery absent the metallization layer.

The solid electrolyte may be a sodium ion-conducting ceramic including, e.g., beta double prime alumina [also termed ($\beta''$)-alumina] and $Na_3Zr_2Si_2PO_{12}$ [NaSICON®]. The solid electrolyte may also include or be coupled to a reinforcing ceramic. Reinforcing ceramics may include, but are not limited to, alumina, zirconium-stabilized alumina, yttrium-stabilized zirconia, including combinations of these ceramics.

The present invention also includes a sodium-forming battery. The sodium battery may include: a sodium-conducting solid electrolyte with an engineered metallization layer that defines an electrically conducting pattern on a surface of the solid electrolyte. The electrically conducting metallization pattern may include features that are engineered to be filled with sodium metal from a sodium metal-forming anode that forms distinct metal islands across the surface of the solid electrolyte during operation. The metallization layer expands the active area of a cathode in electrical communication with the anode via the solid electrolyte compared with a battery absent the metallization layer.

The metallization layer may include a metal or a metal-containing alloy having a standard reduction potential that is greater than sodium.

Metals for the metallization layer may include, e.g., platinum (Pt); gold (Au); silver (Ag), nickel (Ni), copper (Cu), molybdenum (Mo), tin (Sn), lead (Pb), alloys of these various metals, and including combinations of these various metals. Alloys may include, but are not limited to, e.g., Zircalloy®, Hastalloy®, corrosion-resistant alloys, superalloys, and other high-performance alloys.

The metallization layer may include a thickness up to about 100 microns. The metallization layer may include a thickness below about 20 microns. The metallization layer may include a thickness from about 5 microns to about 10 microns.

The solid electrolyte may be coupled to a porous support in a three-dimensional conductive architecture. The metallization layer may extend into pores of the porous support in electrical communication with the solid electrolyte. Pores of the porous support may define the features of the metallization layer. The metallization layer in the features of the porous support may include a thickness below about 5 microns.

The battery may include a current collector coupled to the anode where the metallization pattern on the solid electrolyte provides a continuous electrical path to the current collector of the anode.

The present invention also includes another sodium-forming battery. The sodium battery may include: a sodium-conducting solid electrolyte with an engineered metallization layer that defines an electrically conducting pattern on a surface of the solid electrolyte. The electrically conducting metallization pattern may include features that are engineered to be filled with sodium metal from a sodium metal-forming anode that forms distinct metal islands across the surface of the solid electrolyte during operation. The metallization layer expands the active area of a cathode in electrical communication with the anode via the solid electrolyte compared with a battery absent the metallization layer.

The battery may include a porous support coupled to the solid electrolyte in a three-dimensional conductive architecture. The metallization layer may extend into pores of the porous support and positioned in electrical communication with the solid electrolyte. The pores of the porous support may define the features of the metallization layer.

The metallization layer in the pores of the porous support may include a thickness below about 5 microns.

The battery may include a current collector that couples to the anode. The metallization layer coupled to the solid electrolyte may provide a continuous electrical path to the anode current collector.

The present invention also includes a method for constructing a sodium-forming battery. The method may include introducing an engineered metallization layer on the surface of a sodium-conducting solid electrolyte positioned in the sodium battery. The metallization layer may include an electrically conducting pattern with features that are engineered to be filled with sodium metal from a sodium metal-forming anode during operation that form distinct metal islands across the surface of the solid electrolyte that expand the active area of a cathode in electrical communication with the anode via the solid electrolyte compared with a battery absent the engineered metallization layer.

The engineered metallization layer may be introduced to the surface of the solid electrolyte by screen printing the engineered metallization layer to an external surface of the solid electrolyte.

The engineered metallization layer may be secured to the surface of the solid electrolyte by sintering at a temperature selected to bond the metallization layer to the solid electrolyte. Sintering of the engineered metallization layer may be performed in-situ at a temperature of about 900° C. in air.

The engineered metallization layer may be introduced on the surface of the solid electrolyte at a thickness below about 20 microns.

The method may include coupling a porous support to the solid electrolyte to form a three-dimensional conductive architecture prior to introducing the engineered metallization layer.

The metallization layer may extend into pores of the porous support such that they are in electrical communication with the solid electrolyte, with the pores defining the features of the metallization layer. The metallization layer may be introduced into the pores of the porous support at a thickness below about 5 microns.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

DETAILED DESCRIPTION

A new anode configuration for a sodium battery and method of making are detailed. The anode configuration may include a metallization layer that is positioned on the surface of a solid electrolyte that expands the active area of the cathode during operation that provides enhanced charge transfer, cycling ability, and energy transfer capacity of sodium batteries at intermediate temperatures. The present invention further decreases performance degradation and allows low cost materials to be used for construction and sealing. The following description includes a preferred best mode of the present invention.

While the present invention will be described in reference to operation at intermediate temperatures, the invention is not limited thereto. For example, the present invention may be operated at both intermediate temperatures (at or below 200° C.) and temperatures above 200° C. No limitations are intended. Further, while the invention is susceptible of various modifications and alternative constructions, it should be understood, that there is no intention to limit the invention to the specific form disclosed, but, on the contrary, the invention is intended to cover all modifications, alternative constructions, and equivalents falling within the spirit and scope of the invention as defined in the claims. Therefore the present description should be seen as illustrative and not limiting.

Figure 1:
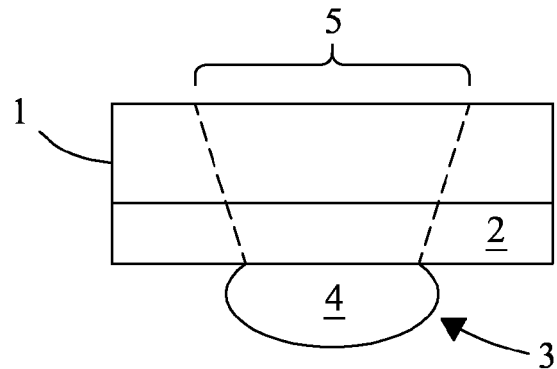
FIG. 1 (prior art) shows a schematic of a conventional sodium battery.

FIG. 1 shows a schematic of a conventional sodium battery that includes a cathode (positive electrode or terminal) 1, a solid electrolyte 2 and a sodium-forming anode (negative electrode or terminal) 3. In the figure, cathode 1 is shown electrically coupled to anode 3 through solid electrolyte 2. Solid electrolyte 2 is also electrically coupled to cathode 1. Solid electrolyte 2 serves as an ionic conductor during operation transporting sodium ($Na^+$) ions between cathode 1 and anode 3. Electrons generated by the battery (cell) may be delivered from cathode 1 to anode 3 through a circuit (not shown) positioned external to solid electrolyte 2 that provides an electrical pathway between the two electrodes. Electrons reaching anode 3 may combine with sodium ions received through solid electrolyte 2 on the anode 3 side of solid electrolyte 2 forming sodium metal 4 at anode 3.

A well-known problem of sodium batteries known to those of ordinary skill in the art is that, at intermediate temperatures (200° C. or less), sodium metal 4 has a reduced capacity to wet the surface of solid electrolyte 2. Wettability is assessed by measuring the wetting angle at the surface of solid electrolyte 2, e.g., by contacting the surface of the solid electrolyte with sodium metal in an atmosphere-controlled glove box, heating the surface to a temperature above the melting temperature of sodium, allowing the molten sodium to stabilize on the surface, collecting an image of the molten sodium at the surface, and then measuring the wetting angle from the image. The decrease in wettability of the surface may lead to pooling of sodium metal 4 at the anode 3, e.g., in a localized area at the center on the anode 3 side of solid electrolyte 2. Pooling of sodium metal 4 can reduce the active area 5 of cathode 1, or the area of the electrode providing electrical current to anode 3 during operation. The reduction in active area 5 may be detected as a decrease in the capacity of the battery when compared to its theoretical capacity. Ultimately, the decrease in current delivered from cathode 1 can affect efficiency, cycling capacity, and performance of the battery (cell).

Figure 2:
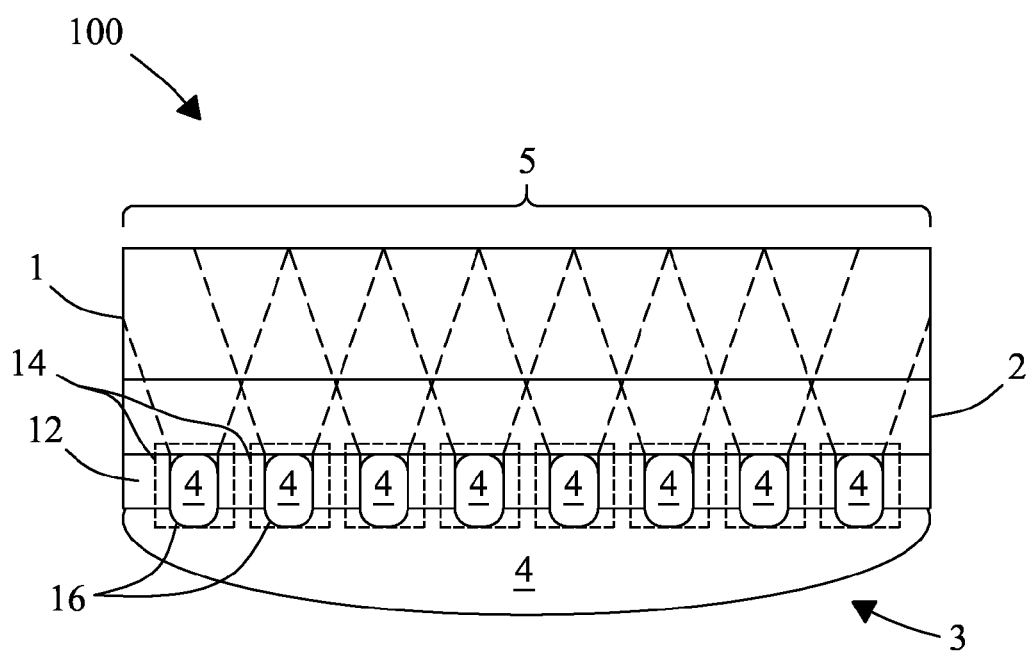
FIG. 2 is a schematic showing one embodiment of the present invention.

FIG. 2 shows a cross-sectional view of a sodium-forming battery (cell) 100 of the present invention. In the figure, solid electrolyte 2 may be configured with a metallization layer 12 that defines a pattern 12 on solid electrolyte 2. Metallization pattern 12 may electrically couple with solid electrolyte 2, e.g., on the anode 3 side of solid electrolyte 2. Position of cell components is not intended to be limited. As shown in the figure, metallization pattern 12 may define features 14 or open well (fill) areas 14 that are distributed across the surface of the solid electrolyte 2. Features 14 of metallization pattern 12 may be engineered to be filled with sodium metal 4 during operation. When filled with sodium metal 4, the features 14 form distinct metal islands 16 that may be distributed across the surface of solid electrolyte 2. When filled with sodium metal 4, features 14 serve to extend the active area 5 of cathode 3 in electrical contact with anode 3. Extension of active area 5 increases the fraction of cathode 3 involved in transfer of sodium ions (i.e., $Na^+$) through solid electrolyte 2 to anode 3 and in the transfer of electrical current to anode 3 during operation. While $Na^+$ ions move through solid electrolyte 2 to cathode 3, electron current may be supplied to anode 3 through an external circuit (not shown) as will be understood by those of ordinary skill in the battery (cell) fabrication arts. The increase in distribution of sodium metal 4 across the surface of solid electrolyte 2 serves to extend the active area 5 of cathode 1 that is in electrical communication with anode 3 and in ion conduction communication with solid electrolyte 2. The increase in transfer of electrons from cathode 1 to anode 3 (e.g., via an anode current collector) can increase the charge transfer capacity, cycling capacity, and performance of the battery (cell) at intermediate temperatures ($\leq 200°$ C.) compared with conventional sodium batteries (cells) that do not include metallization layer (FIG. 1). Thus, the present invention can provide a performance enhancement over conventional sodium battery designs. Sodium metal 4 formed at anode 3 during operation (charging) may be stored in an anode shim or chamber as detailed further herein.

Solid Electrolytes

Solid electrolytes suitable for use in concert with the present invention include, but are not limited to, e.g., conducting ceramics; conducting aluminas including, e.g., beta one prime ($\beta'$) alumina [$Na_2O.11Al_2O_3$], beta double prime ($\beta''$) alumina [$Na_2O.5Al_2O_3$] also known as sodium beta double prime-alumina polycrystalline ceramic; super-ionic conductors; sodium zirconium silicon phosphate ceramics including, e.g., $Na_3Zr_2Si_2PO_{12}$ also known by the trademark NaSICON®; zirconium-stabilized alumina ceramics; yttrium-stabilized zirconia ceramics; including combinations of these various ceramics and electrolyte materials.

Alumina as a solid electrolyte has a number of phases, the most abundant being the alpha (a) phase. Beta "phases" of alumina also exist, but are actually alumina with the incorporation of sodium ions in the lattice. The beta-double prime ($\beta''$ or Beta") phase is a preferred solid electrolyte material as sodium ion is the only conducting ion. Thus, sodium ions pass through, but electrons do not. The crystal microstructure of beta-double prime ($\beta''$ or Beta") alumina solid electrolytes can be strengthened and the fracture resistance increased by incorporating up to about 40 wt % zirconia (e.g., monoclinic zirconia), partially-stabilized zirconia (PSA), or yttrium-stabilized zirconia (YZA) into the ceramic. Alumina ceramics also provide a strong ionic conductivity given the high concentrations of sodium used as a reaction precursor, which makes these materials good solid electrolytes for load-leveling batteries or as electrode materials in these batteries.

Metallization Patterns

Figure 3A:
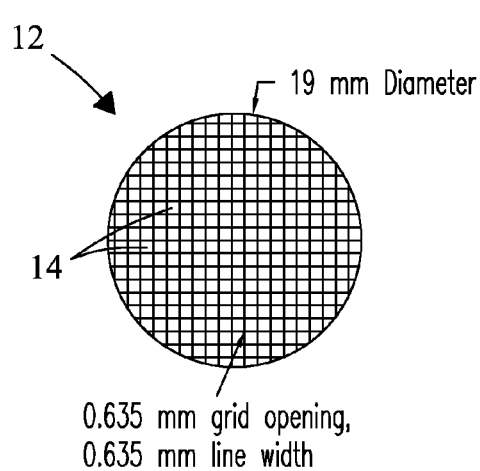
FIGS. 3a-3d show exemplary metallization patterns suitable for use in concert with the present invention.
Figure 3B:
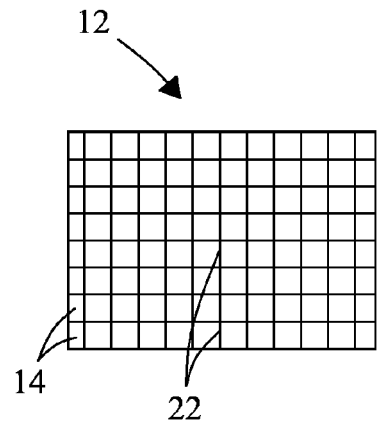

FIG. 3a shows an exemplary metallization pattern 12 that may be applied to solid electrolyte (FIG. 2) or porous supports coupled to the solid electrolyte (FIG. 4) to expand the coverage area of sodium metal and distribute the sodium metal across the surface of the solid electrolyte or the porous supports during operation. In the figure, metallization pattern 12 is in the form of a circular grid 12. Metallization patterns 12 may define non-metalized features 14 or open (i.e., fill) area wells 14 that are engineered to be filled with sodium metal 4 during operation. Features 14 may be of any size that permits them to be filled with sodium metal 4 during operation and that maximizes distribution and coverage of sodium metal 4 across the surface of solid electrolyte 2. Thus, feature sizes are not intended to be limited. In some embodiments, features 14 may define open wells 14 with openings of a size less than or equal to about 1 mm. For example, in the figure, the circular (19-mm diameter) metallization pattern 12 may define a grid 12 with lines 22 of a width about 0.635 mm and features (wells) 14 with openings of a size about 0.635 mm. No limitations are intended. FIG. 3b shows another exemplary metallization pattern 12 that may be employed in concert with the present invention. In the figure, metallization pattern 12 is in the form of a rectangular grid 12 with lines 22 of a selected, non-limiting width, and features (wells) 14 with openings of a selected, non-limiting dimension.

Figure 3C:
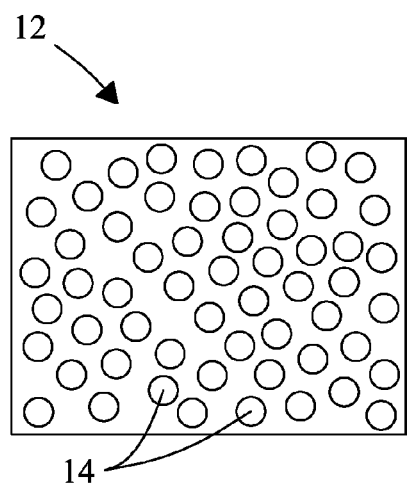
Figure 3D:
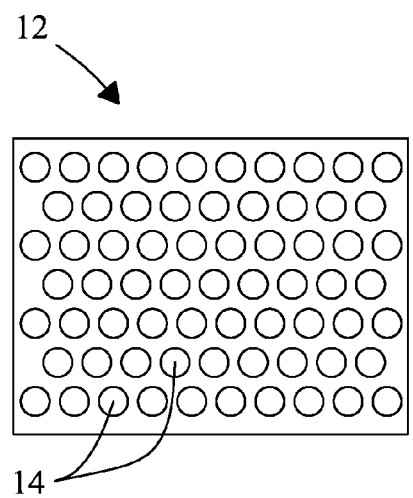

FIGS. 3c-3d show two additional exemplary metallization patterns 12 with features 14 defined by pores 14 of a non-homogeneous type (FIG. 3c) and pores 14 of a homogeneous type (FIG. 3d), respectively. No limitations are intended. Metallization patterns are not limited. In various embodiments, metallization patterns may include, e.g., grid patterns; rectangular grid patterns; circular grid patterns; pore patterns; homogeneous pore patterns; inhomogeneous pore patterns; feature patterns, homogeneous feature patterns; inhomogeneous feature patterns; electrically conducting line patterns, including combinations of these various patterns. No limitations are intended.

Metals in the metallization pattern layer 12 introduced on the surface of the solid electrolyte (FIG. 2) or on the surface of porous supports coupled to the solid electrolyte (FIG. 4) may be any metal that does not react with solid electrolyte 2 or sodium metal 4 formed at anode 3. In addition, all metals and metal alloys that include a reduction potential greater than sodium may be used.

Exemplary metals include, but are not limited to, e.g., platinum (Pt); gold (Au); silver (Ag), nickel (Ni), copper (Cu), molybdenum (Mo), tin (Sn), lead (Pb), alloys thereof, and including combinations of these various metals. No limitations are intended.

Metallization Coverage

Metallization pattern 12 may provide a metallization coverage area (MC) on the surface of solid electrolyte 2 given by Equation [1], as follows:

$$MC = \text{Total Surface Area}[TA] - \text{Open Feature Well (or Fill) Area}[WA] \quad [1]$$

Here, (TA) is the total available area on the surface of solid electrolyte 2; (WA) is the total open (fill) area of feature wells 14 that can be filled with sodium metal 4 during operation; and (MC) is the total metallization area covered by metallization pattern 12. As an example, for a metallization pattern 12 having the form of a grid containing four (4) squares of dimension 1-mm by 1-mm with a metallization frame (line) width of 1-mm, the total surface area (TA) of the solid electrolyte 2 may be about 16-mm$^2$ (i.e., 2-mm×2-mm×2-mm×2-mm). Each feature 14 of grid pattern 12 with an exemplary diameter of 1-mm may define an opening or fill area of about 1 mm$^2$, yielding a total open well fill area (WA) of about 4-mm$^2$ (i.e., 1-mm$^2$+1-mm$^2$+1-mm$^2$+1-mm$^2$). Exemplary grid 12 defines a metallization area of the about 12-mm$^2$, or a metallization coverage (MC) area of about 75%.

In various embodiments, metallization patterns 12 may provide a metallization coverage area on the surface of solid electrolyte 2 of from about 25% to about 75% relative to open fill areas, but coverage area is not intended to be limited.

In some embodiments, metallization pattern 12 yields a surface coverage area of greater than or equal to about 10.

In some embodiments, metallization pattern 12 yields a surface coverage area of less than or equal to about 90.

Metallization Pattern Application

All processes that deliver, attach, and/or bond the engineered metallization layer 12 to surfaces of the solid electrolyte 2 or to surfaces of porous supports (described further in reference to FIG. 4) may be used without limitation. Exemplary processes for introducing metallization pattern layer 12 to the surface of the solid electrolyte 2 or porous supports include, but are not limited to, e.g., printing, screen printing, pad printing, chemical deposition, chemical vapor deposition (CVD); liquid deposition (LD); chemical etching; pressing, tape casting, spray deposition, thermo spraying, thermal deposition, spin casting, including combinations of these various processes.

In some embodiments, metallization pattern 12 may be applied to the external surface of solid electrolyte 2 or to surfaces of porous supports so as to be in electrical contact with solid electrolyte 2, anode 3, and anode current collector 30 during operation.

Porous Supports

Figure 4:
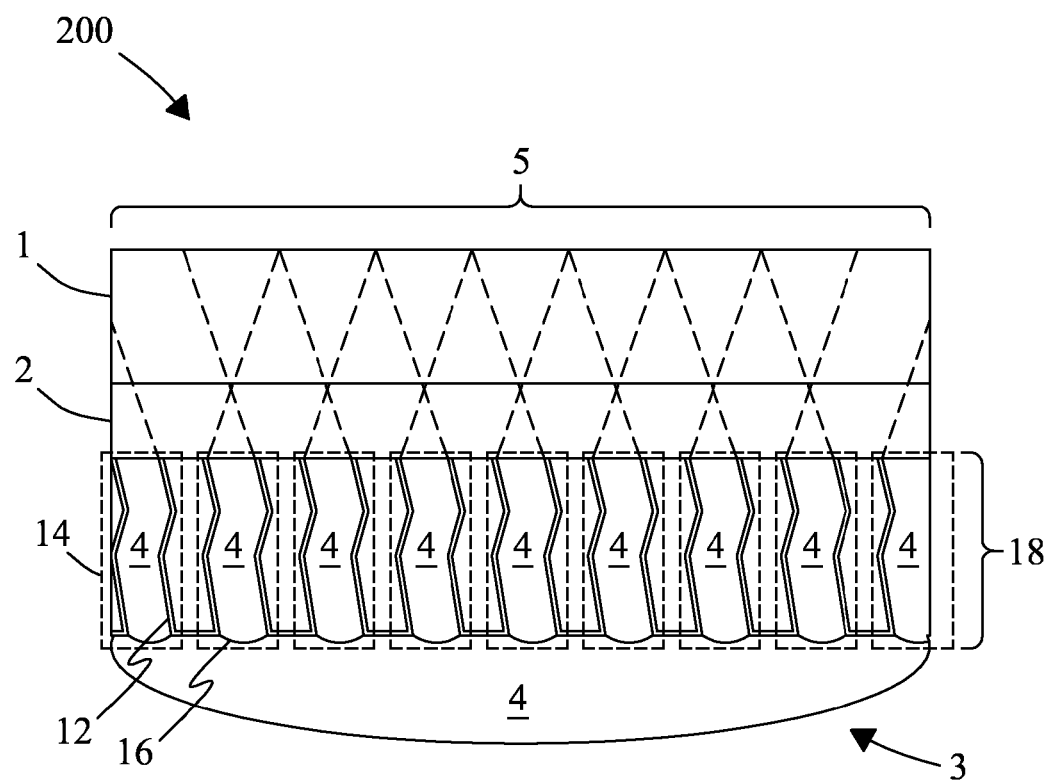
FIG. 4 is a schematic showing another embodiment of the present invention.

FIG. 4 shows a cross-sectional view of another sodium-forming battery (cell) 200 of the present invention. As shown in the figure, a dense layer of solid electrolyte 2 may be attached or coupled to a porous support 18. Porous support 18 may have a mechanical strength sufficiently high to provide structural support to solid electrolyte 2. In the figure, while porous support 18 is shown with a rectangular shape, shapes are not limited. Porous support 18 may also have a thermal expansion that matches solid electrolyte 2, a chemical compatibility with solid electrolyte 2, and a chemical compatibility with sodium metal 4 of anode 3. "Compatibility" means the porous support 18 materials do not react or interfere with the function of solid electrolyte 2 or sodium metal 4 during operation.

In some embodiments, porous support 18 may be a thin porous support 18 with a thickness at or below the thickness of solid electrolyte 2. In some embodiments, porous support 18 may include or be composed of a ceramic. In some embodiments, porous support 18 may be constructed of a machinable ceramic such as yttrium-stabilized zirconia (YSZ), alumina, zirconium-stabilized alumina, B' (single prime) alumina, B" (double prime) alumina, conducting ceramics, including combinations of these various materials ceramics. In some embodiments, porous support 18 may be composed of or include a machinable and chemically stabile metals or stabile metal alloys such as stainless steel or iron chromium (FeCr) alloys. In some embodiments, porous support 18 may be constructed of or include a machinable polymer such as PEEK® that is structurally and chemically stabile at intermediate temperatures at or below 200° C. and temperatures at or above 200° C. No limitations are intended by the exemplary materials.

Porous support 18 may include pores of various sizes that define pore features 14 that allow sodium metal 4 to enter and fill the pores 14 during operation. In some embodiments, pore features 14 may be of a size between about 2 microns and about 10 microns. In some embodiments, pores 14 may be of a size between about 10 microns and about 50 microns. In some embodiments, pores may be of a size between about 20 microns and about 50 microns. However, pore sizes are not intended to be limited to these exemplary values.

Porous support 18 may include a metallization layer 12. As shown, metallization layer 12 may cover the external surface of porous support 18 and/or extend into pore features 14 along the length and depth of the pores 14 so as to be in electrical communication with anode 3. Metallization layer 12 may be applied to the external surface of porous support 18 as described previously with reference to the solid electrolyte. Metallization layer 12 may also be introduced internally into pore features 14 along the length and depth of the pores 14 by introducing a solution containing metal salts dissolved, e.g., in aqueous or non-aqueous solvents into the pore features 14 to infiltrate the pores 14 of porous support 18. Surfactants and complexing/chelating agents may added to the infiltrating liquid to improve wetting of the pore features 14 of porous support 18 and to achieve homogeneous distribution and coating. After infiltration, the porous support 18 containing the infiltrating fluid may be fired in air or a controlled inert atmosphere to decompose the metal salts leaving metallization layer 12 behind on the surface of porous support 18. Desired thicknesses may be obtained for metallization layer 12 within the pore features 14 by repeating the infiltrating process as needed and firing. In some embodiments, an additional metallization pattern layer 12 may be directly applied to the surface of the porous support 18 by screen printing the metallization layer to the surface as described herein to improve electrical conductivity.

In some embodiments, metallization pattern layer 12 may be applied to a porous support 18 already coupled to solid electrolyte 2 such that metallization pattern layer 12 on porous support 18 is in electrical communication with solid electrolyte 2.

In some embodiments, metallization pattern layer 12 may be applied to the porous support 18 before porous support 18 is coupled or sintered to solid electrolyte 2. In some embodiments, metallization pattern layer 12 may be applied to a porous support 18 that is already sintered to solid electrolyte 2.

Metallization layer 12 may also be applied to porous support 18 such that the metallization layer 12 extends into, and covers external surfaces of the pores of the porous support. When metalized, pores of the porous support 18 may define features 14 of metallization layer 12 that provide electrical communication with the surface of solid electrolyte 2.

During operation, sodium metal 4 from anode 3 may be delivered directly into the metallized features 14 now present in metallization layer 12 through porous support 18 that are in electrical communication with the surface of solid electrolyte 2, e.g., on the anode 3 side of solid electrolyte 2. Pore features 14 of porous support 18 when filled with sodium metal 4 can also distribute sodium metal 4 across the surface of metallization layer 12 so as to be in electrical communication with solid electrolyte 2 during operation, thereby maximizing the active (ion conducting) area 5 of cathode 1 in contact with anode 3 via the solid electrolyte 2 as detailed hereinabove. All metallization approaches as will be performed by those of ordinary skill in the art in view of this disclosure are within the scope of the present invention. No limitations are intended by the exemplary embodiments detailed herein. No limitations are intended.

Sintering

Sintering is a preferred method for bonding the metallization layer to other components such as porous supports and solid electrolytes detailed herein due to the simplicity of operation and the minimization of other process chemicals or generation of residues. However, processes for bonding are not intended to be limited. In some embodiments, metallization pattern 12 may be sintered to surfaces of solid electrolyte 2 at selected temperatures to anchor or bond metallization pattern 12 to solid electrolyte 2. In some embodiments, a porous support (FIG. 4) may be sintered at selected temperatures to solid electrolyte 2 to bond the materials together and to ensure that porous support 18 is in electrical communication with solid electrolyte 2.

In some embodiments, sintering may be performed at a temperature of about 300° C. In some embodiments, sintering may be performed at a temperature of about 500° C. In some embodiments, sintering may be performed at a temperature up to about 900° C. In some embodiments, sintering may be performed at a temperature of 900° C. in air. In some embodiments, sintering may be performed, e.g., at a temperature of 1400° C. for a time of 2 hours. In some embodiments, sintering may be performed in-situ at a selected sintering temperature. Sintering temperatures and duration times are not intended to be limited. For example, sintering temperatures and durations may depend at least in part on the materials being bonded together. All temperatures and durations that provide suitable bonding between the solid electrolyte 2 and the porous support 16 may be employed without limitation.

Metallization Thickness

Thickness of metallization pattern 12 is not limited. Thicknesses depend in part on the materials selected and that facilitate application to the solid electrolyte 2. Thicknesses are preferred that maximize contact between the anode metal and the Solid electrolyte 2 during operation and that facilitate application and sintering during construction.

In some embodiments, thicknesses may be selected below about 100 microns ($\mu m$). In some embodiments, thicknesses may be selected below about 50 microns ($\mu m$). In some embodiments, thicknesses may be less than or equal to about 20 microns ($\mu m$).

Battery Cell [1]

Figure 5:
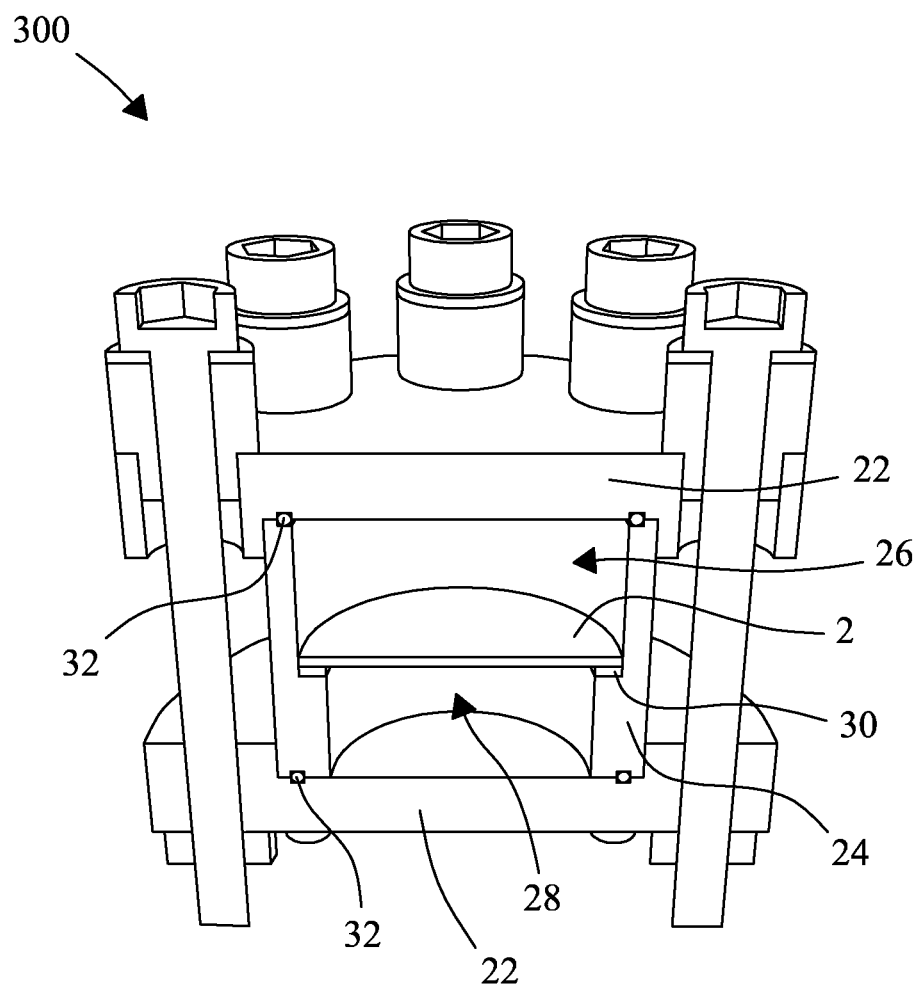
FIG. 5 shows a cross-sectional view of the embodiment of FIG. 2.

FIG. 5 shows a cross-sectional view of another sodium battery (cell) 300 of the present invention. Battery 300 may include a battery body (block) 24 configured with a cathode 1 and an anode 3. Cell block 24 may be constructed of various economical materials including, but not limited to, e.g., stainless steel, molybdenum-clad stainless steel, or another conducting metal or metal alloy. Cathode 1 may include a cathode reservoir 26 defined by an annular ring 24. Anode 3 may include an anode reservoir 28 defined by another annular ring 24. Rings 24 may be constructed of or include materials described herein including, but not limited to, e.g, metals, metal alloys, ceramics, conducting ceramics, insulating ceramics, and combinations of these various materials. Alloys may include, but are not limited to, e.g., Zircalloy®, Hastelloy®, and other insulating alloys. Ceramics may include, but are not limited to, e.g., alumina and zirconia. Rings 24 are configured to provide electrical separation between cathode reservoir 26 and anode reservoir 28 to prevent shorting of the battery cell 300 during operation. While cathode reservoir 26 and anode reservoir 28 described herein are annular, shapes are not limited as will be appreciated by those of ordinary skill in the art.

In some embodiments, cathode reservoir 26 may be constructed of or include a metal halide such as nickel chloride ($NiCl_2$) that is infiltrated with granules of nickel (Ni) and a salt such as NaCl. In some embodiments, cathode reservoir 26 may be filled with a catholyte (electrolyte) such as sodium aluminum chloride ($NaAlCl_4$) that is configured to deliver sodium ($Na^+$) ions through solid electrolyte 2 to anode 3. Sodium metal formed at the surface of solid electrolyte 2 may be stored in anode reservoir 28. In some embodiments, solid electrolyte 2 may be coupled to a porous support (described previously in reference to FIG. 4).

Cathode reservoir 26 and anode reservoir 28 may be electrically isolated to prevent shorting during operation. For example, solid electrolyte 2 with its metallization layer (described previously in reference to FIG. 2) may be sealed with seals 30 (e.g., glass seals) to the annular alloy or ceramic rings 24 that define cathode reservoir 26 and anode reservoir 28. Seals 30 may be sintered at a selected temperature (e.g., 900° C.) to couple the materials together. Seals 30 may prevent leakage of liquid catholyte (electrolyte) from cathode reservoir 26 and may isolate cathode reservoir 26 from anode reservoir 28.

Compression seals 32 may be employed to physically isolate cathode reservoir 26 and anode reservoir 28 from the external environment, e.g., to prevent influx of air into the reservoirs and into the battery. Cathode reservoir 26 and anode reservoir 28 may be isolated from the exterior environment with compressive seals 32 positioned, e.g., at the end of each reservoir to prevent air from entering into the reservoirs. Compression seals 32 may be constructed of any material that do not react with electrodes 1 and 3, solid electrolyte 2, sodium metal 4, or other materials in the battery including, e.g., $NiCl_2$, $NaAlCl_4$ at selected operating temperatures. In some embodiments, compression seals 32 may be O-rings constructed of a selected metal or polymer. Metals suitable for use include, but are not limited to, e.g., gold and silver. Polymers suitable for use include, but are not limited to, e.g., fluoropolymers such as TEFLON® or other chemically compatible polymers. In some embodiments, the compression seals may be composed of chemically compatible polymers that are also coated with selected metals described herein.

Battery Cell [2]

Figure 6:
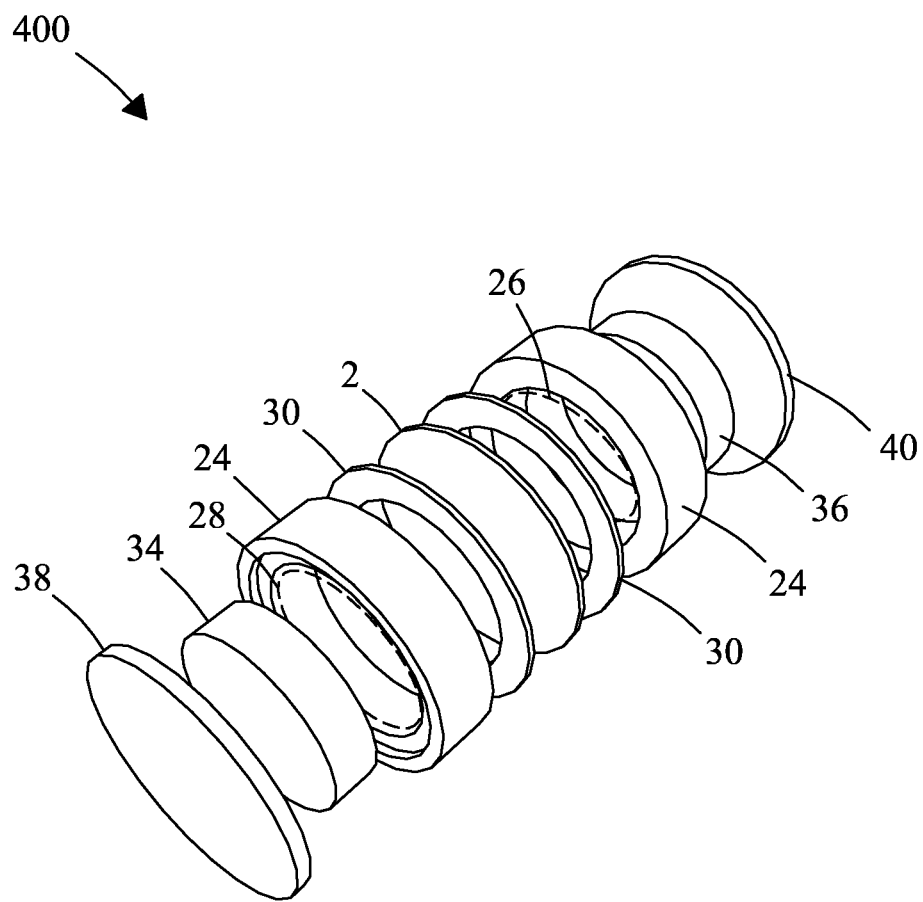
FIG. 6 shows another view of the embodiment of FIG. 2.

FIG. 6 shows an expanded view of another battery (cell) 400 of the present invention. Battery (cell) 400 may include a cathode 1 and an anode 3. Cathode 1 and anode 3 may each include a reservoir 24 and 26 defined by an annular ring 24 constructed of selected insulating materials detailed previously herein. Solid electrolyte 2 with its metallization layer (described previously in reference to FIG. 2) or a metallization layer coupled to a porous support (described previously in reference to FIG. 4) may be sintered to respective reservoirs 26 and 28 with a seal 30 (e.g., a glass seal 30) at a selected sintering temperature (e.g., 900° C.). Seals 30 isolate cathode reservoir 26 from anode reservoir 28 preventing shorting. Cathode reservoir 26 and anode reservoir 28 may be sealed to prevent air from entering the respective compartments from the exterior environment with a compressive seal 32 positioned, e.g., at the top of each respective reservoir. Position of compressive seals 32 is not intended to be limited.

Battery (cell) 400 may also include current collectors 34 and 36 positioned to collect and transfer current within and between respective reservoirs. In the figure, a cathode current collector (contact) 34 and an anode collector (contact) 36 may insert into respective cathode reservoir 26 and anode reservoir 28 to enhance performance and electrical conductivity of battery cell 400. In some embodiments, current collectors may be attached, e.g., to ends of the respective reservoirs. However, position is not intended to be limited.

Current collectors (contact) 34 and 36 may be constructed of various conducting materials including, but not limited to, e.g., metals, metal alloys (e.g., stainless steel), ceramics, and combinations of these materials. In some embodiments, current collectors 34 and 36 may be in the form of a spring-loaded metal shim constructed of, e.g., stainless steel that can be inserted directly into the respective cathode or anode chambers to serve as a cathode conductor or an anode conductor. No limitations are intended. In various embodiments, current collectors 34 and 36 may be composed of or include molybdenum (Mo) metal. In some embodiments, the current collector may include an alloy (e.g., stainless steel). In some embodiments, the current collector may be a metal spring [e.g., a molybdenum (Mo) spring] positioned at an end of each electrode (cathode and anode). In some embodiments, the current collector may be constructed of a metal foil. The metal foil may be positioned, e.g., on the top of or at an end of the electrode. For example, in some embodiments detailed herein, edges of alloy or ceramic rings (FIG. 5) that define respective cathode and anode chambers may be in direct contact with the anode and cathode electrodes with a current collector constructed of a metal foil (e.g., Mo foil) as a current collector. In some embodiments, the current collector may include a spring-loaded shim composed of a metal or a metal alloy that provides electrical conductivity to and from the anode or the cathode within the battery or electrochemical cell, respectively.

Battery (cell) 400 may also include a cathode endplate (cap) 38 and an anode endplate (cap) 40 positioned at respective ends of reservoir 26 and 28 to enclose the respective cathode reservoir 26 and anode reservoir 28.

In some embodiments, current collectors 34 and 36 may be in the form of a metal leads (e.g., nickel leads) that are attached (e.g., welded) to electrode endplates 38 and 40 to provide electrical conductivity to and from the cathode reservoir 26 and the anode reservoir 28 within battery (cell) 400, respectively. Endplates 38 and 40 may be constructed of or include selected materials described herein such as ceramics (e.g., alumina), metals, metal alloys (e.g., aluminized steel or stainless steel), and combinations of these various materials. Materials may be insulated to prevent shorting between the cathode 1 and anode 3. Endplates 38 and 40 may be compression-sealed to the annular rings that define the respective electrode reservoirs with a compression seal (not shown) as detailed previously herein in reference to FIG. 5. Solid electrolyte 2 may be sealed to the annular rings 24 that define the respective cathode reservoir 26 and anode reservoir 28 with a metal seal (e.g., gold O-ring discussed in reference to FIG. 5) or other seal (e.g., glass seal detailed in reference to FIG. 5) affixed to both sides of solid electrolyte 2. No limitations are intended.

While exemplary materials for selected components have been described, the present invention is not intended to be limited thereto. For example, all materials as will be selected by those of ordinary skill in the battery fabrication or electrical arts in view of the disclosure are within the scope of the present invention. No limitations are intended by the disclosure of exemplary materials.

Charging Capacity

Figure 7A:
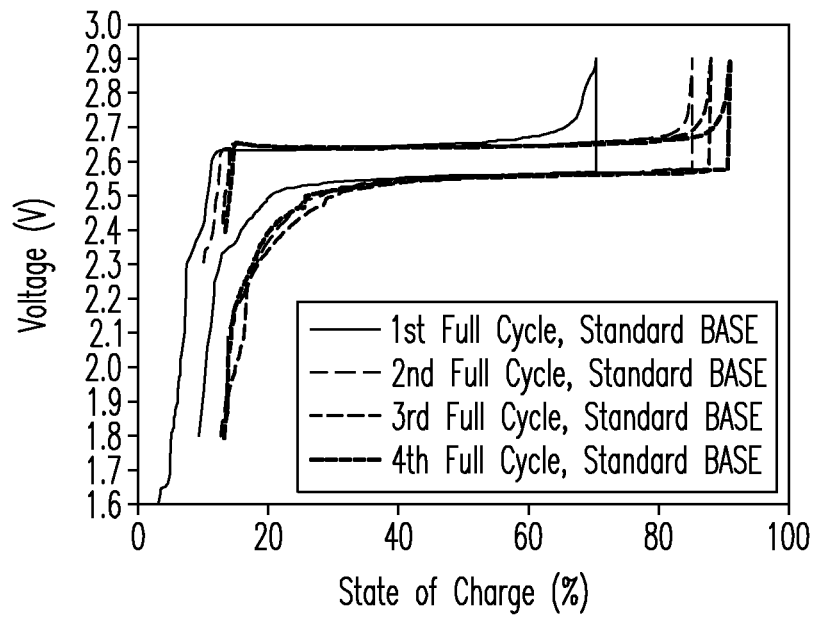
FIGS. 7a-7b compare the charge state of a conventional sodium battery and a battery of the present invention equipped with a metallization layer of the present invention as a function of voltage.
Figure 7B:
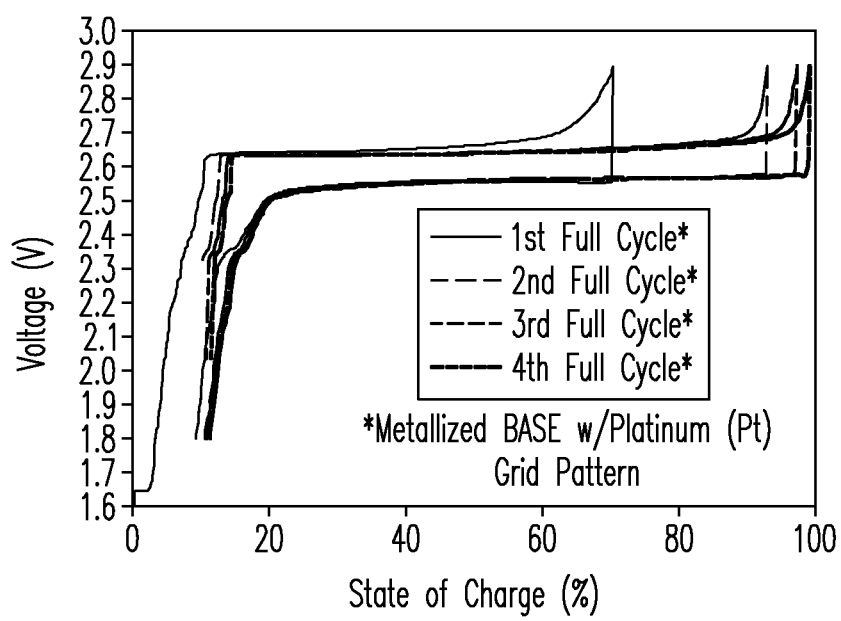

FIG. 7a shows the charging capacity of a conventional battery (cell) with a standard solid electrolyte. In these cells, the theoretical capacity (C) value was about 2.9 Volts. During operation, assembled cells were heated in air to a temperature of 175° C. and subsequently charged and discharged 4 times over a voltage range of between about 1.8 V and about 2.8 V at a rate of C/16 [i.e., defined as $1/16^{th}$ of the theoretical capacity (C)] in an attempt to achieve a maximum state of charge (i.e., charge capacity) in the battery. Charging was conducted in two steps: (i) up to 90% of capacity at a C/3 rate (the theoretical limit being 2.9V) and (ii) the remaining 10% of capacity at a C/10 rate. As shown in the figure, the conventional cell reached only 90% of theoretical capacity after 4 full charging cycles. FIG. 7b compares results obtained for an exemplary button cell of the present invention (described previously in reference to FIG. 5) equipped with the metallization pattern layer coupled to solid electrolyte. Results show that with the metalized solid electrolyte, the battery cell achieved well over 90% of its full theoretical capacity after 4 full charging cycles.

Cycling Capacity

Figure 8A:
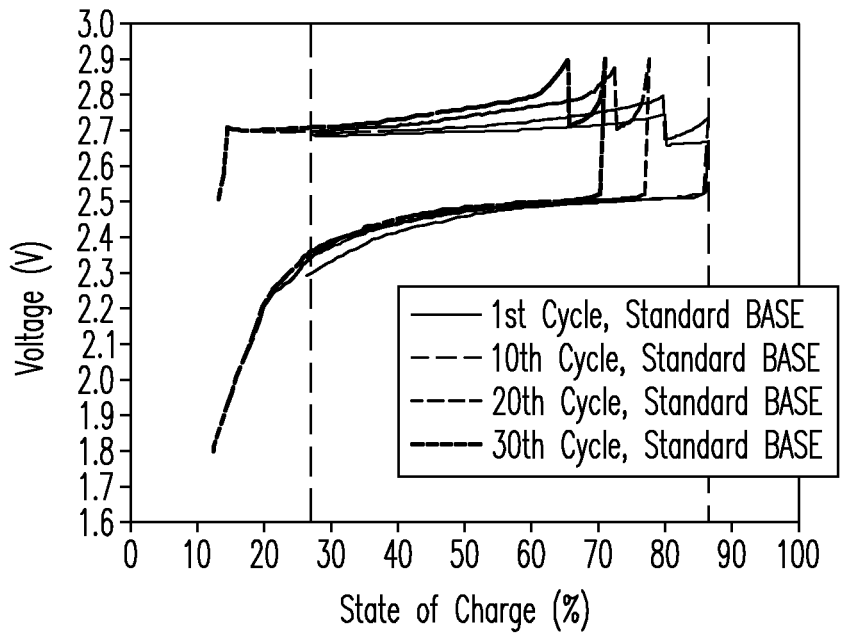
FIGS. 8a-8b compare cycling capacity of a conventional sodium battery and a battery of the present invention equipped with a metallization layer as a function of voltage.

FIG. 8a shows the charge state of a conventional battery (cell) with standard solid electrolyte. Cells were cycled (i.e., charged/discharged) up to 30 times at a rate of C/3 [i.e., $1/3^{rd}$ of the theoretical capacity (C) where (C)=2.9 V] starting at a charge level of about 60% of the theoretical capacity (e.g., about 1.8 Volts). During operation, a maximum charge state that is about 85% of the theoretical capacity maximum is reached following the first cycle. Results further show a gradually increasing charge voltage requirement at the end of the cycle. The conventional battery cells further exhibit an increasingly worsening charge state after 30 cycles, as evidenced by the charging hysteresis. Results may be attributed to a limited and localized active area caused by poor sodium wetting. In addition, charging at the C/3 rate is limited, which leads to a more discharged state after each charging cycle.

Figure 8B:
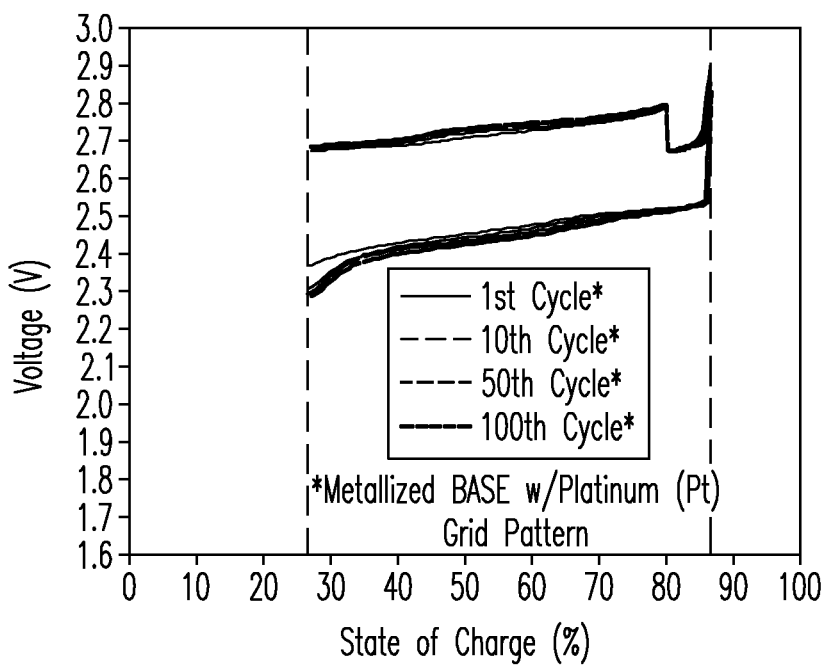

FIG. 8b compares the charge state of a battery cell of the present invention that includes a metallization pattern layer on the solid electrolyte as described herein. The cell was cycled (i.e., charged/discharged) up to 30 times at a rate of C/3 [i.e., $1/3^{rd}$ of the theoretical capacity (C) where (C)=2.9 V] starting at a charge level of about 60% of the theoretical capacity (e.g., about 1.8 Volts). Results show that during operation, a stable cycling behavior was achieved within the cycling window between 27% and 87% of the maximum charge state, even after 100 charging cycles. No decrease in charge capacity is observed, as evidenced by the absence of hysteresis. And, no increase in end of charge voltage is required. Results indicate the metallization layer extends the active area of the cell even with poor sodium wettability at the intermediate operation temperature of 175° C.

The following examples provide a further understanding of various aspects of the present invention.

EXAMPLE 1

Application of Metallization Pattern Layer on Solid Electrolyte

A metallization pattern layer may be directly applied to the solid electrolyte or porous supports coupled to the solid electrolyte by screen-printing a commercially available metal paste containing metal powders with a metal content of from about 30 wt % to about 80 wt % dispersed in an organic binder and solvent. The metal paste is delivered through a screen with a desired pattern to the solid electrolyte or porous support at a desired or selected thicknesses detailed hereinabove. The screen-printed metal paste on the surface of the solid electrolyte or porous support may then be heated in an oven until the metal paste is dry (e.g., at 80° C. for 30 minutes). No limitations are intended. Once dried, the metallization pattern layer may be sintered at a temperature between about 600° C. and about 1000° C. in air or in an inert atmosphere such as argon for a time that ensures adhesion between the metallization layer and the solid electrolyte, or the porous support.

EXAMPLE 2

Application of Metallization Pattern Layer to Porous Support

Pore features of porous supports may also be metallized by infiltrating the pores with solutions containing dissolved metal-containing salts such as metal nitrate salts and metal carbonate salts prepared in aqueous or non-aqueous solvents available commercially. Various solutions of metal containing salts of various concentrations may be used. No limitations are intended. Surfactants and complexing/chelating agents may also be added to the solution to improve the wettability of pores of the porous support by the solution to achieve homogeneous coating. Infiltration of the pores may also assisted by vacuum treatment. After infiltration, the solid electrolyte may be fired in air or an otherwise controlled atmosphere to decompose the metal salts and leave the metals behind on the surface of the porous support. A desired thickness for the metallization layer within the pores of the porous support may be obtained by infiltrating the porous support multiple times with the infiltrating solution and firing. An additional metallization layer may be directly applied to the surface of the porous support to improve electrical conductivity by screen printing the metallization layer to the surface as described herein.

EXAMPLE 3

Battery of FIG. 5

A solid electrolyte including a metallization pattern layer was glass-sealed to an $\alpha$-$Al_2O_3$ ring that includes an active cell area of about ~3 cm². The cell was assembled in a glove box. 1 g of cathode granules consisting of nickel (Ni), NaCl, and small quantities (<1%) of additives such as iron sulfide (FeS) and sodium iodide (NaI) were used. After the granules were dried at 270° C. under vacuum to remove all traces of moisture, molten $NaAlCl_4$ secondary electrolyte was infiltrated into the cathode. A foil and a spring made of molybdenum (Mo) were placed on the top of the cathode as a current collector. A spring-loaded stainless steel shim, which served as a molten sodium reservoir, was inserted into the anode compartment. Anode and cathode end plates were then compression-sealed to both sides of $\alpha$-$Al_2O_3$ ring using gold O-rings. Nickel leads, which served as current collectors, were welded to the electrode end plates.

EXAMPLE 4

Battery of FIG. 6

A solid electrolyte 2 including a metallization pattern layer 2 was glass-sealed to an $\alpha$-$Al_2O_3$ ring having an active cell area of about ~3 cm². The Na/$NiCl_2$ cell was assembled in a glove box with 1 g of cathode granules composed of nickel (Ni), NaCl, and small quantities (<1%) of additives such as iron sulfide (FeS) and sodium iodide (NaI). Granules were dried at 270° C. under vacuum to remove all traces of moisture. Molten $NaAlCl_4$ secondary electrolyte was then introduced into the cathode reservoir.

While exemplary embodiments of the present invention have been shown and described, it will be apparent to those skilled in the art that many changes and modifications may be made without departing from the invention in its true scope and broader aspects. The appended claims are therefore intended to cover all such changes and modifications as fall within the spirit and scope of the present invention.

What is claimed is:

1. A solid electrolyte, comprising:
a metallization layer comprising a densified metal selected from the group consisting of: platinum (Pt); gold (Au); silver (Ag), nickel (Ni), copper (Cu), molybdenum (Mo), tin (Sn), lead (Pb), alloys thereof, and combinations thereof of a selected thickness bonded to the anode side of the solid electrolyte with a plurality of circular or rectangular features of a selected size distributed in the form of a grid in a plane defined across the surface of the solid electrolyte that defines a metallization pattern, the features accumulate sodium metal in operation forming distinct metal islands that expand the area of the anode in active ionic contact with the cathode compared to the solid electrolyte absent the metallization layer.

2. The solid electrolyte of claim 1, wherein the solid electrolyte comprises beta double prime alumina, a sodium ion conductive ceramic, a super-ionic conductor, $Na_3Zr_2Si_2PO_{12}$, and combinations thereof.

3. The solid electrolyte of claim 1, wherein the metallization pattern comprises a metal or a metal alloy having a reduction potential greater than sodium.

4. The solid electrolyte of claim 1, wherein the metallization pattern includes a thickness below about 100 microns.

5. The solid electrolyte of claim 1, wherein the distribution of features in the metallization pattern is homogeneous.

6. The solid electrolyte of claim 1, wherein the distribution of features in the metallization pattern is non-homogeneous.

7. The solid electrolyte of claim 1, wherein the features in the metallization pattern include a size less than or equal to about 1 millimeter to about 20 microns.

8. A sodium battery, comprising:
a solid electrolyte with a metallization layer comprising a densified metal selected from the group consisting of: platinum (Pt); gold (Au); silver (Ag), nickel (Ni), copper (Cu), molybdenum (Mo), tin (Sn), lead (Pb), alloys thereof, and combinations thereof bonded to the anode side thereof with a plurality of circular or rectangular features of a selected size distributed in the form of a grid in a plane defined across the surface that defines a metallization pattern therein, the features accumulate sodium metal in operation at temperatures selected at or below about 200° C. that form distinct metal islands that expand the area of the anode in active ionic contact with the cathode compared to the solid electrolyte absent the metallization layer.

9. The battery of claim 8, wherein the solid electrolyte comprises beta double prime alumina, a sodium ion conductive ceramic, a super-ionic conductor, $Na_3Zr_2Si_2PO_{12}$, and combinations thereof.

10. The battery of claim 8, wherein the metallization pattern comprises a metal or a metal alloy with a reduction potential greater than sodium.

11. The battery of claim 8, wherein the metallization pattern includes a thickness below about 100 microns.

12. The battery of claim 8, wherein the distribution of features in the metallization pattern is homogeneous.

13. The battery of claim 8, wherein the distribution of features in the metallization pattern is non-homogeneous.

14. The battery of claim 8, wherein the features in the metallization pattern include a size less than or equal to about 1 millimeter to about 20 microns.

* * * * *